US007652963B2

(12) United States Patent
Nakamori

(10) Patent No.: US 7,652,963 B2
(45) Date of Patent: Jan. 26, 2010

(54) CIRCUIT FOR DETECTING RECORDED AREA

(75) Inventor: Kiyoshi Nakamori, Osaka (JP)

(73) Assignee: Panasonic Corporation, Osaka (JP)

( * ) Notice: Subject to any disclaimer, the term of this patent is extended or adjusted under 35 U.S.C. 154(b) by 835 days.

(21) Appl. No.: 10/553,216

(22) PCT Filed: Feb. 15, 2005

(86) PCT No.: PCT/JP2005/002207

§ 371 (c)(1), (2), (4) Date: Oct. 13, 2005

(87) PCT Pub. No.: WO2006/001099

PCT Pub. Date: Jan. 5, 2006

(65) Prior Publication Data

US 2006/0285464 A1 Dec. 21, 2006

(30) Foreign Application Priority Data

Jun. 23, 2004 (JP) ............................ 2004-185353

(51) Int. Cl.
*G11B 7/00* (2006.01)

(52) U.S. Cl. ............... 369/53.24; 369/53.35; 369/53.33

(58) Field of Classification Search ............... 369/53.24
See application file for complete search history.

(56) References Cited

U.S. PATENT DOCUMENTS 5,155,722 A * 10/1992 Yoshida .................. 369/47.52
5,229,985 A 7/1993 Oshiba
6,891,785 B2 * 5/2005 Yamamoto et al. ....... 369/47.28
2003/0151995 A1 * 8/2003 Asada et al. .............. 369/53.2

FOREIGN PATENT DOCUMENTS

| | | |
|---|---|---|
| JP | 4-32026 | 2/1992 |
| JP | 5-266578 | 10/1993 |
| JP | 10-011900 | 1/1998 |
| WO | WO 2004/036563 A1 | 4/2004 |

OTHER PUBLICATIONS

Supplementary European Search Report issued in European Patent Application No. EP 05719109 dated Apr. 1, 2009.
Japanese Office Action, with English Translation, issued in Japanese Patent Application No. JP 2005-518123, mailed Oct. 14, 2008.

* cited by examiner

*Primary Examiner*—Lixi Chow
(74) *Attorney, Agent, or Firm*—McDermott Will & Emery LLP

(57) ABSTRACT

In a circuit for detecting a recorded area of an optical disk, when unnecessary noise is superimposed on the space portion of the digitized signal (RF) of an RF signal from the optical disk, a counter (20) for detecting a space portion detects the noise and resets a counter (81) for detecting a recorded area with an output signal S21 therefrom. This prevents the counter (81) for detecting a recorded area from erroneously outputting a recorded area detection signal (S12) due to the noise. As a result, a counter (80) for detecting an unrecorded area outputs an unrecorded area detection signal (S20) with high accuracy to bring a recorded area signal (RECD) from a flip-flop circuit (82) to the L level. Accordingly, an unrecorded area can be detected as it is inherently with high accuracy without being erroneously recognized as a portion in which a mark portion has been recorded.

2 Claims, 17 Drawing Sheets

NOISE
CLK
RF
S20
S41
S51
S52
S12
RECD

CLK
RF
S80
S81
RECD
NOISE

CIRCUIT FOR DETECTING RECORDED AREA

This application is the U.S. National Phase under 35 U.S.C. § 371 of International Application No. PCT/JP05/002207, filed Feb. 15, 2005, which in turn claims the benefit of Japanese Application No. 2004-185353, filed Jun. 23, 2004, the disclosures of which Applications are incorporated by reference herein in their entirety.

TECHNICAL FIELD

The present invention relates to a circuit for detecting a recorded area of an optical disk with high accuracy.

BACKGROUND ART

Conventionally, a circuit for detecting a recorded area of an optical disk has digitized an electric signal obtained from an optical pick-up unit and detected a range in which the digitized signal is supplied continuously for a specified time as a recorded area, as disclosed in, e.g., Patent Document 1.

FIG. 15 shows such a conventional circuit for detecting a recorded area of an optical disk. In FIG. 15, 80 is a counter for detecting an unrecorded area, 81 is a counter for detecting a recorded area, and 82 is a flip-flop circuit for holding an output signal.

In the foregoing circuit for detecting a recorded area of an optical disk, a digitized signal RF obtained by digitizing an RF signal is inputted to the counter 81 for detecting a recorded area and an output signal S81 therefrom is connected to each of the reset terminal of the counter 80 for detecting an unrecorded area and the set terminal of the flip-flop circuit 82. A reference clock CLK is inputted to the counter 80 for detecting an unrecorded area and an output signal S80 therefrom is connected to each of the reset terminal of the counter 81 for detecting a recorded area and the clock terminal of the flip-flop circuit 82. The time interval between successive generation of the output signal S80 from the counter 80 has been set to be sufficiently longer than the time interval between successive generation of the output signal S81 from the counter 81. The flip-flop circuit 82 has the D-terminal thereof connected to the ground GND and outputs a signal RECD.

A description will be given herein below to the operation of the circuit for detecting a recorded area thus constituted with reference to an overall structural view of FIG. 15 and a timing chart in a normal state of FIG. 16.

In FIG. 15, the digitized signal RF of the RF signal is inputted first to the counter 81 for detecting a recorded area. In the recorded area of an optical disk, the counter 81 outputs the signal S81 to the counter 80 for detecting an unrecorded area every time it counts a given number of mark portions (L-level portions) to trigger a reset, while simultaneously bringing the recorded area signal RECD as an output of the flip-flop circuit 82 to the "H" level, so that the recorded area is detected. In the unrecorded area, the digitized signal RF of the RF signal is not inputted to the counter 81 for detecting a recorded area so that the counter 81 is brought into a halted state. Accordingly, the counter 80 for detecting an unrecorded area is not reset by the counter 81 for detecting a recorded area and continues to count based on the reference clock CLK. When the counter 80 for detecting an unrecorded area has counted for a specified time, it outputs the signal S80 to bring the output signal RECD from the flip-flop circuit 82 to the "L" level so that the unrecorded area is detected, while resetting the counter 81 for detecting a recorded area. Patent Document 1: Japanese Laid-Open Patent Publication No. HEI 5-266578 (page 7 and FIG. 1)

DISCLOSURE OF THE INVENTION

Problem to be Solved by the Invention

In the structure of the conventional circuit for detecting a recorded area, however, the output signal S81 is erroneously outputted from the counter 81 for detecting a recorded area when unnecessary noise is superimposed on the space portion (H-level portion) of the digitized signal of the RF signal, as shown in FIG. 17. Since the output signal S81 resets the counter 80 for detecting an unrecorded area, the output signal S80 is not outputted from the counter 80 so that the output signal RECD from the flip-flop circuit 82 is held at the "H" level. Accordingly, the circuit for detecting a recorded area continues to detect the recorded area and may erroneously detect a portion to be detected inherently as an unrecorded area as a recorded area on some occasions. As a result, a recorded area cannot be detected precisely any more.

The present invention has been achieved to solve the conventional problem described above and it is therefore an object of the present invention to provide a circuit for detecting a recorded area which allows high-accuracy detection of a signal-recorded area of an optical disk even when unnecessary noise is superimposed on the digitized signal of an RF signal.

To attain the foregoing object, the present invention adopts a structure which frequently resets a counter for detecting a recorded area and forcibly resets the counter for detecting a recorded area upon detecting the mixture of noise to reduce the frequency with which the counter for detecting a recorded area erroneously outputs signals when unnecessary noise is superimposed on the digitized signal of the RF signal.

Specifically, a circuit for detecting a recorded area of an optical disk according to the present invention comprises: a counter for detecting an unrecorded area; and a counter for detecting a recorded area, wherein the counter for detecting an unrecorded area receives a reference clock, outputs an unrecorded area detection signal as a first output, and outputs a reset signal to the counter for detecting a recorded area as a second output and the counter for detecting a recorded area receives a digitized signal obtained by digitizing an RF signal from the optical disk and produces an output serving as a reset signal for resetting the counter for detecting an unrecorded area and also as a recorded area detection signal.

In the circuit for detecting a recorded area according to the present invention, respective times elapsed until the unrecorded area detection signal is outputted from the counter for detecting an unrecorded area, until the reset signal is outputted to the counter for detecting a recorded area, and until the recorded area detection signal is outputted from the counter for detecting a recorded area satisfy a relationship represented by: Time Elapsed Until Unrecorded Area Detection Signal is Outputted>Time Elapsed Until Reset Signal is Outputted to Counter for Detecting Recorded Area>Time Elapsed Until Recorded Area Detection Signal is Outputted, wherein the time elapsed until the unrecorded area detection signal is outputted is longest.

A circuit for detecting a recorded area of an optical disk according to the present invention comprises: a counter for detecting an unrecorded area; a counter for detecting a recorded area; and a counter for detecting a space portion, wherein the counter for detecting an unrecorded area receives a reference clock and produces an output serving as an unrecorded area detection signal, the counter for detecting a recorded area receives a digitized signal obtained by digitizing an RF signal from the optical disk and produces an output serving as a reset signal for resetting the counter for detecting an unrecorded area and also as a recorded area detection signal, and the counter for detecting a space portion receives each of the reference clock and the digitized signal to be reset with a mark portion of the digitized signal and outputs the reset signal to the counter for detecting a recorded area.

In the circuit for detecting a recorded area according to the present invention, a time elapsed from a reset until the reset signal is outputted to the counter for detecting a recorded area in the counter for detecting a space portion and a time of a longest space portion of the digitized signal satisfy a relationship represented by: Time Elapsed Until Reset Signal is Outputted to Counter for Detecting Recorded Area>Time of Longest Space Portion.

A circuit for detecting a recorded area of an optical disk according to the present invention comprises: a counter for detecting an unrecorded area; a counter for detecting a recorded area; and a counter for detecting a mark portion, wherein the counter for detecting an unrecorded area receives a reference clock and produces an output serving as an unrecorded area detection signal, the counter for detecting a recorded area receives a digitized signal obtained by digitizing an RF signal from the optical disk and produces an output serving as a reset signal for resetting the counter for detecting an unrecorded area and also as a recorded area detection signal, and the counter for detecting a mark portion receives each of the reference clock and the digitized signal to be reset with a space portion of the digitized signal and outputs the reset signal to the counter for detecting a recorded area.

In the circuit for detecting a recorded area according to the present invention, a time elapsed after a reset until the reset signal is outputted to the counter for detecting a recorded area in the counter for detecting a mark portion and a time of a shortest mark portion of the digitized signal satisfy a relationship represented by: Time of Shortest Mark Portion>Time Elapsed Until Reset Signal is Outputted to Counter for Detecting Recorded Area.

A circuit for detecting a recorded area of an optical disk according to the present invention comprises: a counter for detecting an unrecorded area; a counter for detecting a recorded area; and a counter for detecting a mark portion, wherein the counter for detecting an unrecorded area receives a reference clock and produces an output serving as an unrecorded area detection signal and also as a reset signal to the counter for detecting a recorded area, the counter for detecting a recorded area receives an output of the counter for detecting a mark portion and produces an output serving as a reset signal for resetting the counter for detecting an unrecorded area and also as a recorded area detection signal, and the counter for detecting a mark portion receives each of the reference clock and a digitized signal obtained by digitizing an RF signal from the optical disk to be reset with a space portion of the digitized signal.

A circuit for detecting a recorded area of an optical disk according to the present invention comprises: a counter for detecting an unrecorded area; a counter for detecting a recorded area; and a counter for detecting a space portion, wherein the counter for detecting an unrecorded area receives a reference clock and produces an output serving as an unrecorded area detection signal and also as a reset signal to the counter for detecting a recorded area, the counter for detecting a recorded area receives an output of the counter for detecting a space portion and produces an output serving as a reset signal for resetting the counter for detecting an unrecorded area and also as a recorded area detection signal, and the counter for detecting a space portion receives each of the reference clock and a digitized signal obtained by digitizing an RF signal from the optical disk to be reset with a mark portion of the digitized signal.

A circuit for detecting a recorded area of an optical disk according to the present invention comprises: a counter for detecting an unrecorded area; a counter for detecting a recorded area; a counter for detecting a space portion; and a counter for detecting a mark portion, wherein the counter for detecting an unrecorded area receives a reference clock and produces an output serving as an unrecorded area detection signal, the counter for detecting a recorded area receives a digitized signal obtained by digitizing an RF signal from the optical disk and produces an output serving as a reset signal for resetting the counter for detecting an unrecorded area and also as a recorded area detection signal, the counter for detecting a space portion receives each of the reference clock and the digitized signal to be reset with a mark portion of the digitized signal and outputs the reset signal to the counter for detecting a recorded area, and the counter for detecting a mark portion receives each of the reference clock and the digitized signal to be reset with a space portion of the digitized signal and outputs the reset signal to the counter for detecting a recorded area.

In the circuit for detecting a recorded area according to the present invention, the counter for detecting a space portion halts an operation upon detecting the mark portion of the digitized signal and resumes the operation upon detecting the space portion of the digitized signal.

In the circuit for detecting a recorded area according to the present invention, the counter for detecting a space portion measures a time elapsed after a reset and outputs the reset signal to the counter for detecting a recorded area when the measured time exceeds a longest space time of the digitized signal.

In the circuit for detecting a recorded area according to the present invention, the counter for detecting a mark portion halts an operation upon detecting the space portion of the digitized signal and resumes the operation upon detecting the mark portion of the digitized signal.

In the circuit for detecting a recorded area according to the present invention, the counter for detecting a mark portion measures a time elapsed after a reset until a next reset and outputs the reset signal to the counter for detecting a recorded area when the measured time is less than a shortest mark time of the digitized signal.

A circuit for detecting a recorded area of an optical disk according to the present invention comprises: a counter for detecting an unrecorded area; a counter for detecting a recorded area; a counter for detecting a space portion; a counter for detecting a mark portion; and a flip-flop circuit, wherein the counter for detecting an unrecorded area receives a reference clock and produces an output serving as an unrecorded area detection signal and also as a reset signal to the counter for detecting a recorded area, the counter for detecting a recorded area receives an output of the flip-flop circuit and produces an output serving as a reset signal for resetting the counter for detecting an unrecorded area and also as a recorded area detection signal, the counter for detecting a space portion receives each of the reference clock and a digitized signal obtained by digitizing an RF signal from the optical disk to be reset with a mark portion of the digitized signal and produces an output to be inputted to a reset input of the flip-flop circuit, and the counter for detecting a mark portion receives each of the reference clock and the digitized signal to be reset with a space portion of the digitized signal and produces an output to be given to a set input of the flip-flop circuit.

In the circuit for detecting a recorded area according to the present invention, the counter for detecting a mark portion outputs a pulse when a time of the detected mark portion is not less than a shortest mark time and not more than a longest mark time.

In the circuit for detecting a recorded area according to the present invention, the counter for detecting a mark portion measures a time elapsed from a reset until a next reset, compares the measured time with each of a shortest mark time and a longest mark time, and outputs a pulse when the measured time is not less than the shortest mark time and not more than the longest mark time.

In the circuit for detecting a recorded area according to the present invention, the counter for detecting a space portion outputs a pulse when a time of the detected space portion is not less than a shortest space time and not more than a longest space time.

In the circuit for detecting a recorded area according to the present invention, the counter for detecting a space portion measures a time elapsed from a reset until a next reset, compares the measured time with each of a shortest space time and a longest space time, and outputs a pulse when the measured time is not less than the shortest space time and not more than the longest space time.

In the circuit for detecting a recorded area according to the present invention, respective times elapsed until the unrecorded area detection signal is outputted from the counter for detecting an unrecorded area and until the recorded area detection signal is outputted from the counter for detecting a recorded area satisfy a relationship represented by: Time Elapsed Until Unrecorded Area Detection Signal is Outputted>Time Elapsed Until Recorded Area Detection Signal is Outputted.

By thus constituting the counter for detecting an unrecorded area such that it outputs two types of signals which are the unrecorded area detection signal and the reset signal to the counter for detecting a recorded area and that the output period of the reset signal to the counter for detecting a recorded area is shorter than the output period of the unrecorded area detection signal, the present invention allows frequent resetting of the counter for detecting a recorded area at a stage prior to the outputting of the unrecorded area detection signal. As a result, even though unnecessary noise is superimposed on the digitized signal of the RF signal, the probability of erroneous generation of an output signal from the counter for detecting a recorded area is reduced. Accordingly, the probability of erroneous detection of a recorded area resulting from erroneous resetting of the counter for detecting an unrecorded area is also reduced so that the recorded area is detected with high accuracy.

In accordance with the present invention, even though unnecessary noise is superimposed on the space portion or mark portion of the digitized signal of the RF signal, the counter for detecting a space portion or the counter for detecting a mark portion detects the noise and resets the counter for detecting a recorded area. This reduces the probability of erroneous generation of an output signal from the counter for detecting a recorded area and also reduces the probability of erroneous detection of a recorded area resulting from erroneous resetting of the counter for detecting an unrecorded area. As a result, the recorded area is detected with high accuracy.

EFFECT OF THE INVENTION

Thus, the circuit for detecting a recorded area according to the present invention can reduce the probability of erroneous recognition by which an unrecorded area of an optical disk is erroneously detected as a recorded area thereof even though unnecessary noise is superimposed on the digitized signal of an RF signal from the optical disk. Accordingly, it becomes possible to detect the recorded area with high accuracy.

BRIEF DESCRIPTION OF THE DRAWINGS

FIG. 17 is a timing chart showing signals in the individual portions of the conventional circuit for detecting a recorded area when noise has been mixed in.

DESCRIPTION OF NUMERALS

Figure 1:
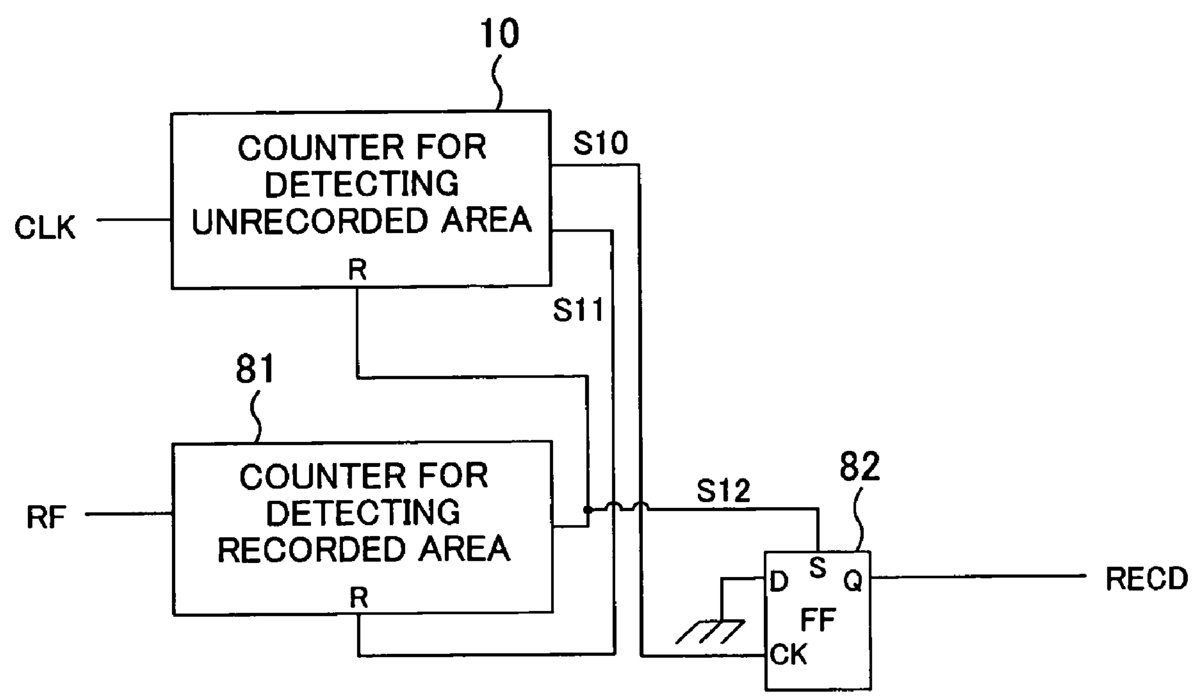
FIG. 1 is a view showing a circuit for detecting a recorded area of an optical disk according to a first embodiment of the present invention.

10, 80 Counter for Detecting Unrecorded Area

20, 50 Counter for Detecting Space Portion

30, 40 Counter for Detecting Mark Portion

60 OR Circuit

70, 82 Flip-Flop Circuit

81 Counter for Detecting Recorded Area

S10, S20 Unrecorded Area Detection Signal

S11 Reset Signal to Counter for Detecting Recorded Area

RF Digitized Signal

CLK Reference Clock

S12 Reset Signal to Counter for Detecting Unrecorded Area or Recorded Area Detection Signal S21, S31 Reset Signal to Counter for Detecting Unrecorded Area

BEST MODE FOR CARRYING OUT THE INVENTION

Referring to the drawings, the embodiments of the present invention will be described herein below.

Embodiment 1

FIG. 1 shows the structure of a circuit for detecting a recorded area of an optical disk in a first embodiment of the present invention.

In the drawing, 10 is a counter for detecting an unrecorded area to which a reference clock CLK has been inputted, 81 is a counter for detecting a recorded area, and 82 is a flip-flop circuit. The counter 10 for detecting an unrecorded area outputs an unrecorded area detection signal S10 as a first output signal and outputs a reset signal S11 for resetting the counter 81 for detecting a recorded area as a second output signal. In the unrecorded area of an optical disk, the unrecorded area detection signal S10 is set to be outputted only after the lapse of a sufficiently longer time than a time which elapses before the reset signal S11 is outputted.

The counter 81 for detecting a recorded area receives, as an input, a digitized signal RF obtained by digitizing an RF signal from the optical disk, while receiving the reset signal S11 from the counter 10 for detecting an unrecorded area which is inputted to the reset terminal of the counter 81. An output of the counter 81 for detecting a recorded area is inputted as a reset signal to the reset terminal of the counter 10 for detecting an unrecorded area and also inputted as a recorded area detection signal S12 to the set terminal S of the flip-flop circuit 82. The flip-flop circuit 82 has a D-terminal connected to the ground GND and a clock signal to which the unrecorded area detection signal S10 from the counter 10 for detecting an unrecorded area is inputted.

Figure 2:
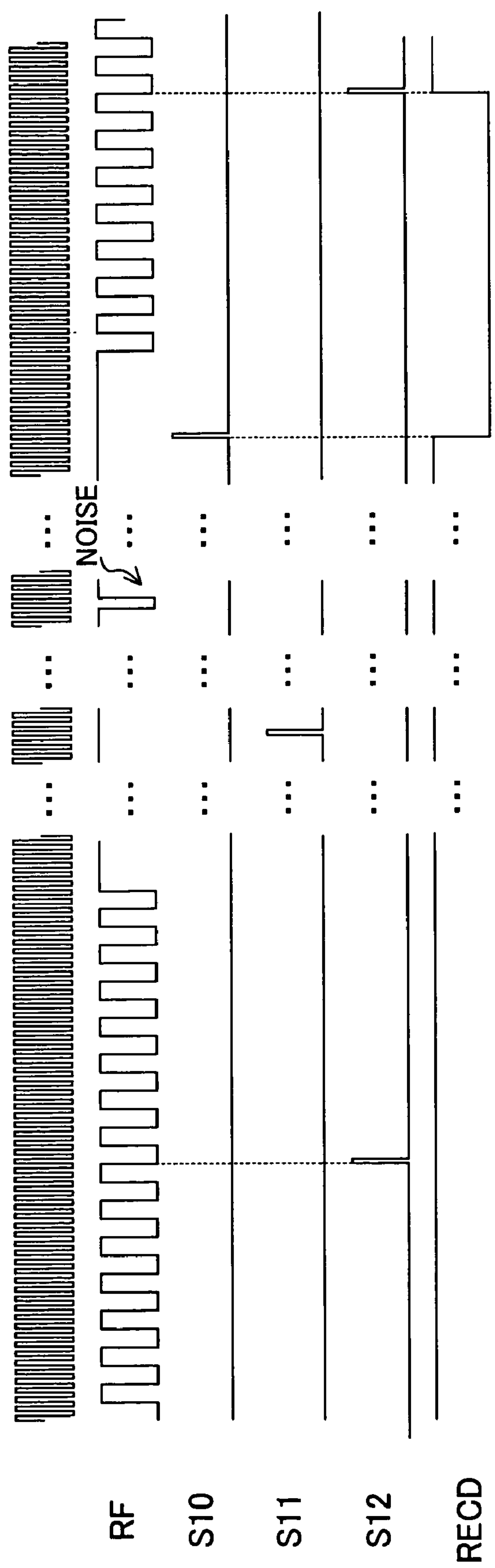
FIG. 2 is a timing chart showing signals in the individual portions of the circuit for detecting a recorded area.

A description will be given herein below to the operation of the circuit for detecting a recorded area of an optical disk thus constituted according to the present embodiment with reference to the timing charts of FIGS. 1 and 2.

First, the digitized signal RF of the RF signal is inputted to the counter 81 for detecting a recorded area. The counter 81 for detecting a recorded area outputs a reset signal to the counter 10 for detecting an unrecorded area every time it counts a specified number of mark portions (L-level portions) in the recorded area of the optical disk, while simultaneously outputting the recorded area detection signal S12 to the set terminal S of the flip-flop circuit 82 to bring a recorded area signal RECD to the "H" level.

In the unrecorded area of the optical disk, on the other hand, the mark portion of the digitized signal RF is not inputted to the counter 81 for detecting a recorded area so that the counter 81 is brought into a halted state. Accordingly, the counter 10 for detecting an unrecorded area is not reset by the counter 81 for detecting a recorded area and continues to count based on the reference clock CLK. When the counter 10 for detecting an unrecorded area has counted for a specified time, it outputs the reset signal S11 to reset the counter 81 for detecting a recorded area. When the state in which the mark portion of the digitized signal RF of the RF signal is not inputted further continues, the unrecorded area detection signal S10 is outputted this time to bring the recorded area signal RECD from the flip-flop circuit 82 to the "L" level. In the recorded area, the reset signal S11 from the counter 10 for detecting an unrecorded area has been set to be outputted only after a lapse of a sufficiently longer time than a time which elapses before the recorded area detection signal S12 is outputted from the counter 81 for detecting a recorded area. Accordingly, the reset signal S11 is not outputted in the recorded area.

Thus, according to the present embodiment, the counter 81 for detecting a recorded area is reset in a period shorter than the time interval between successive outputting of the unrecorded area detection signal S10. Therefore, even when unnecessary noise is superimposed on the digitized signal RF of the RF signal, the probability of erroneous operation of the counter 81 due to noise can be reduced. This allows higher-accuracy detection of a recorded area than has been performed conventionally.

Embodiment 2

Figure 3:
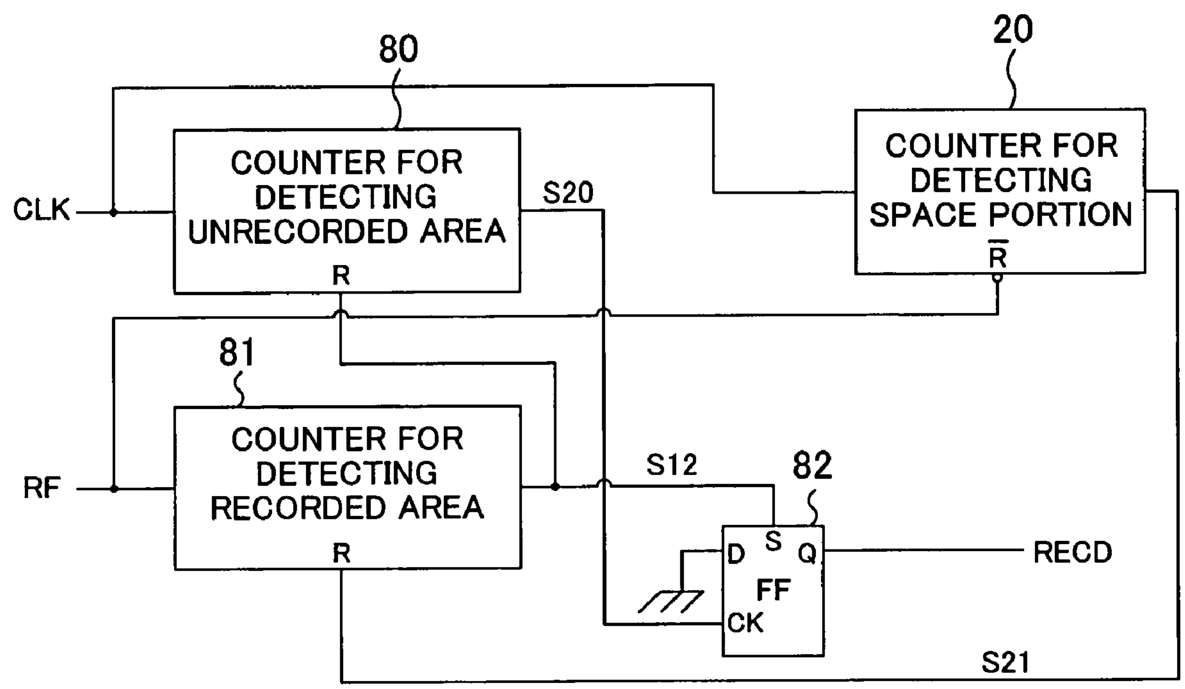
FIG. 3 is a view showing a circuit for detecting a recorded area of an optical disk according to a second embodiment of the present invention.

FIG. 3 shows the structure of a circuit for detecting a recorded area of an optical disk in a second embodiment of the present invention.

In the drawing, an additional counter 20 for detecting a space portion is newly provided. The counter 20 for detecting a space portion has an input terminal to which the reference clock CLK is inputted and a reset terminal to which an inversion signal of the digitized signal RF of the RF signal is inputted such that it is reset by the mark portion (L-level portion) of the digitized signal. An output of the counter 20 for detecting a space portion is connected as a reset signal S21 to the reset terminal of the counter 81 for detecting a recorded area. A counter 80 for detecting an unrecorded area outputs only an unrecorded area detection signal S20 inputted to the clock terminal of the flip-flop circuit 82. The time interval between successive outputting of the unrecorded area detection signal S20 from the counter 81 has been set to be sufficiently longer than the time interval between successive outputting of the recorded area detection signal S12 from the counter 81 in the recorded area. As for the other components, they are the same as shown in FIG. 1 so that the description thereof will be omitted by using like reference numerals to designate like parts.

Figure 4:
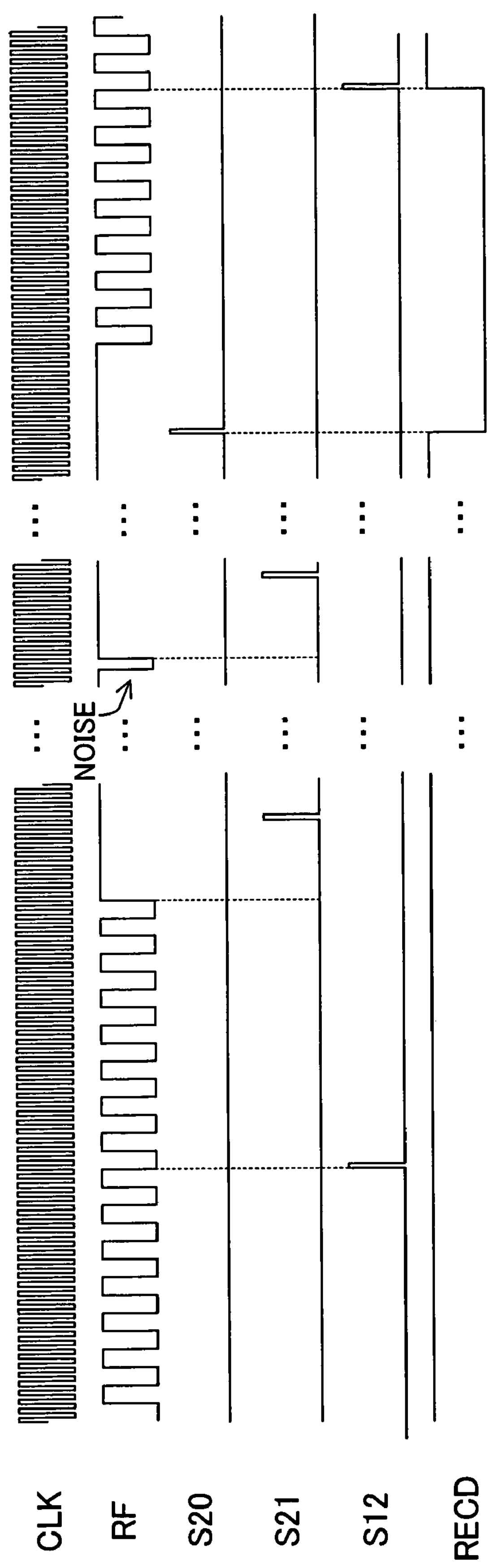
FIG. 4 is a timing chart showing signals in the individual portions of the circuit for detecting a recorded area.

A description will be given herein below to the operation of the circuit for detecting a recorded area with reference to the timing charts of FIGS. 3 and 4.

First, the digitized signal RF of the RF signal is inputted to the counter 81 for detecting a recorded area. The counter 81 for detecting a recorded area outputs the reset signal S12 to the counter 80 for detecting an unrecorded area to trigger a reset every time it counts a specified number of mark portions in the recorded area of the optical disk, while simultaneously bringing the recorded area signal RECD from the flip-flop circuit 82 to the "H" level. In the mean time, the counter 20 for detecting a space portion performs the operation of being reset with the mark portion (L-level portion) of the digitized signal and starting counting when the digitized signal has shifted to the space portion. In the recorded area, however, there is no counting up to a value not less than a set value so that the reset signal S21 is not outputted.

On the other hand, in the unrecorded area of the optical disk, the counter 20 for detecting a space portion counts up to a value not less than the set value to detect a space portion with a length not less than a maximum space length from the digitized signal, recognizes the signal-unrecorded area to output the reset signal S21 to the counter 81 for detecting a recorded area so that the counter 81 stops the counting operation. In the unrecorded area, the digitized signal RF of the RF signal has only a space portion (H-level portion) and no mark portion (L-level portion) so that the counter 81 for detecting a recorded area is brought into a halted state. Accordingly, the counter 80 for detecting an unrecorded area is not reset by the counter 81 for detecting a recorded area and continues to count based on the reference clock CLK. When the counter 81 for detecting a recorded area has counted for a specified time, it outputs the unrecorded area detection signal S20 to bring the recorded area signal RECD from the flip-flop circuit 82 to the "L" level.

Even when noise is superimposed on the unrecorded area, the possibility that a space portion with a length not less than a maximum space length comes subsequently is high and therefore the probability that the reset signal S21 is outputted from the counter 20 for detecting a space portion is high. As a result, it becomes possible to reset the counter 81 for detecting a recorded area even when the counter 81 has erroneously counted the number of mark portions due to the noise. This prevents erroneous resetting of the counter 80 for detecting an unrecorded area and allows higher-accuracy detection of a recorded area than has been performed conventionally.

Embodiment 3

Figure 5:
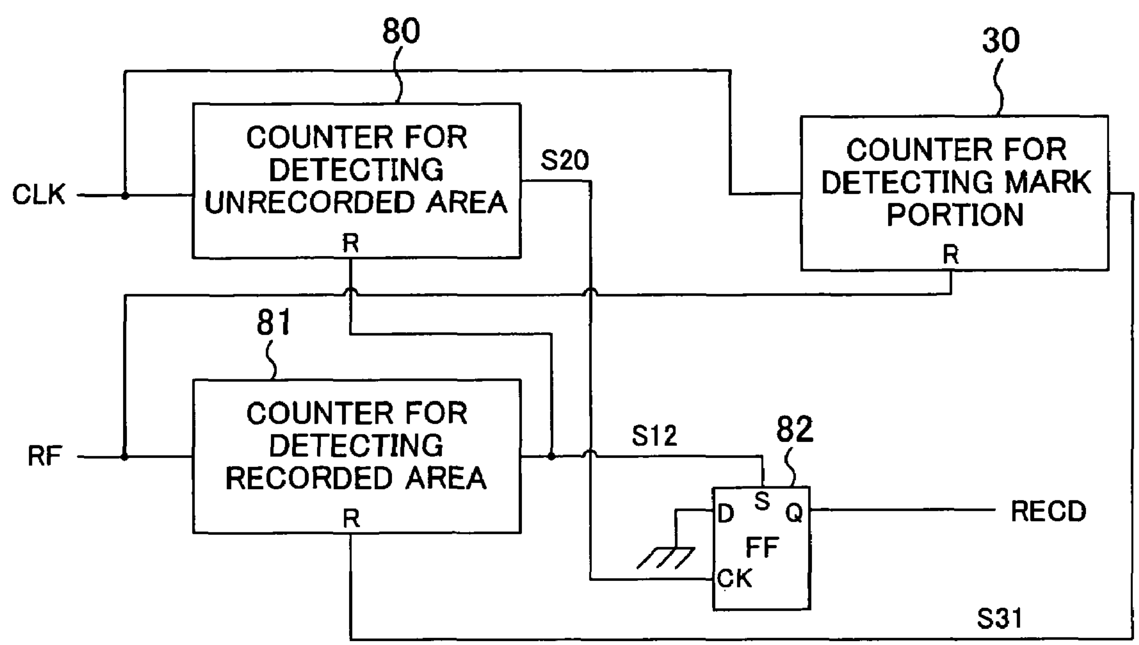
FIG. 5 is a view showing a circuit for detecting a recorded area of an optical disk according to a third embodiment of the present invention.

FIG. 5 shows the structure of a circuit for detecting a recorded area of an optical disk in a third embodiment of the present invention.

The circuit for detecting a recorded area shown in the drawing has been obtained by disposing a counter 30 for detecting a mark portion in place of the counter 20 for detecting a space portion shown in FIG. 3. When the reference clock CLK is inputted to the input terminal of the counter 30 for detecting a mark portion and the digitized signal RF of the RF signal is inputted to the reset terminal thereof, the counter 30 performs the operation of being reset with the space portion (H-level portion) of the digitized signal and starting counting when the digitized signal has shifted to the mark portion. When the counter 30 for detecting a mark portion is reset at a count not more than a set value, i.e., when a mark portion with a length not more than a minimum mark length is detected, the counter 30 recognizes that unnecessary noise has been superimposed on the space portion (signal-unrecorded area) and outputs a reset signal S31 to the counter 81 for detecting a recorded area. The reset signal S31 is inputted to the reset terminal of the counter 81 for detecting a recorded area. The time interval between successive outputting of the unrecorded area detection signal S20 from the counter 80 has been set to be sufficiently longer than the time interval between successive outputting of the reset signal S12 from the counter 81 in the recorded area of the optical disk. As for the other components, they are the same as in FIG. 3 so that the description thereof will be omitted by using like reference numerals to designate like parts.

Figure 6:
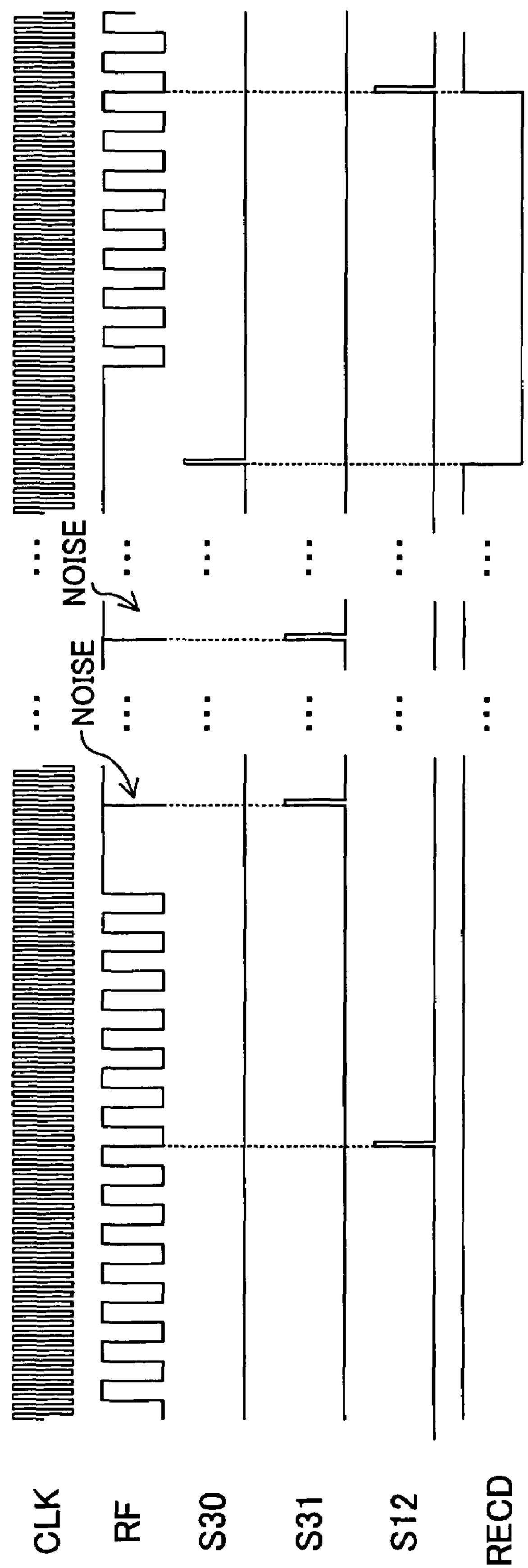
FIG. 6 is a timing chart showing signals in the individual portions of the circuit for detecting a recorded area.

A description will be given herein below to the operation of the circuit for detecting a recorded area of an optical disk thus constituted according to the present embodiment with reference to the timing charts of FIGS. 5 and 6.

First, the digitized signal RF of the RF signal is inputted to the counter 81 for detecting a recorded area. The counter 81 for detecting a recorded area outputs the reset signal S12 to the counter 80 for detecting an unrecorded area to trigger a reset every time it counts a specified number of mark portions in the recorded area of the optical disk, while simultaneously bringing the recorded area signal RECD as an output of the flip-flop circuit 82 to the "H" level. In the mean time, the counter 30 for detecting a mark portion performs the operation of being reset with the space portion and starting counting when the digitized signal has shifted to the mark portion.

When unnecessary noise is superimposed on the space portion of the digitized signal, the counter 30 for detecting a mark portion is reset at a count not more than a set value to detect a mark portion with a length not more than the minimum mark length, recognize that unnecessary noise has been superimposed on the signal-unrecorded area, and output the reset signal S31 to the counter 81 for detecting a recorded area. In the unrecorded area, the mark portion of the digitized signal RF is not inputted to the counter 81 for detecting a recorded area so that the counter 81 is brought into a halted state. Accordingly, the counter 80 for detecting an unrecorded area is not reset by the counter 81 for detecting a recorded area and continues to count based on the reference clock CLK. When the counter 80 for detecting an unrecorded area has counted for a specified time, it outputs the unrecorded area detection signal S20 to bring the recorded area signal RECD from the flip-flop circuit 82 to the "L" level so that an unrecorded area is displayed.

Thus, according to the present embodiment, even when unnecessary noise is superimposed on the unrecorded area of an optical disk, the time during which noise stays superimposed has a high possibility of being not more than the minimum mark length. As a result, it becomes possible to reset the counter 81 for detecting a recorded area by using the counter 30 for detecting a mark portion. This prevents erroneous resetting of the counter 80 for detecting an unrecorded area and allows higher-accuracy detection of a recorded area than has been performed conventionally.

Embodiment 4

Figure 7:
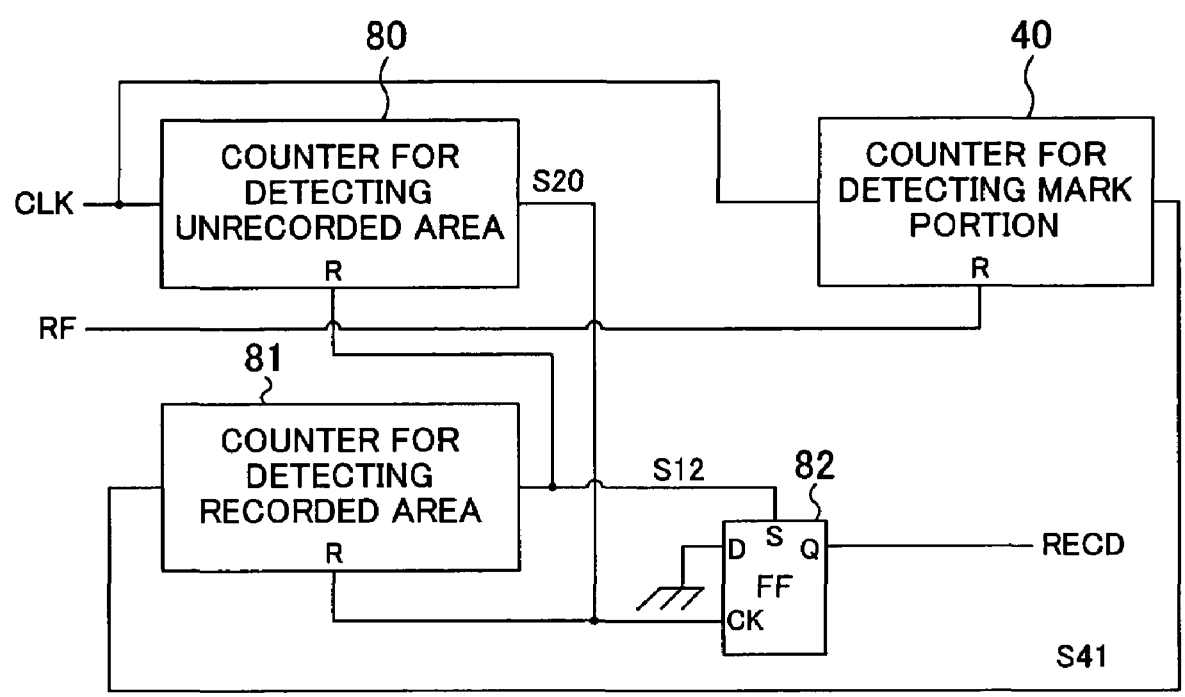
FIG. 7 is a view showing a circuit for detecting a recorded area of an optical disk according to a fourth embodiment of the present invention.

FIG. 7 shows the structure of a circuit for detecting a recorded area of an optical disk in a fourth embodiment of the present invention.

The circuit for detecting a recorded area shown in the drawing comprises a counter 40 for detecting a mark portion having an internal structure different from that of the counter 30 for detecting a mark portion shown in FIG. 5. When the reference clock CLK is inputted to the input terminal of the counter 40 for detecting a mark portion and the digitized signal RF of the RF signal is inputted to the reset terminal thereof, the counter 40 for detecting a mark portion measures the length of a mark portion recorded in the digitized signal RF through time measurement based on the reference clock CLK, compares the measured mark length with the minimum mark length and a maximum mark length, and outputs an output signal (pulse) S41 only when the measured mark length falls between the minimum and maximum mark lengths by judging that the mark portion has been read normally. The output signal S41 is inputted for the detection of a recorded area to the counter 81 for detecting a recorded area. The unrecorded area detection signal S20 from the counter 80 for detecting an unrecorded area is inputted as a reset signal to the reset terminal R of the counter 81 for detecting a recorded area. The time interval between successive outputting of the unrecorded area detection signal S20 from the counter 80 has been set to be sufficiently longer than the time interval between successive outputting of the reset signal S12 from the counter 81 in the recorded area of the optical disk. As for the other components, they are the same as in FIG. 5 so that the description thereof will be omitted by using like reference numerals to designate like parts.

Figure 8:
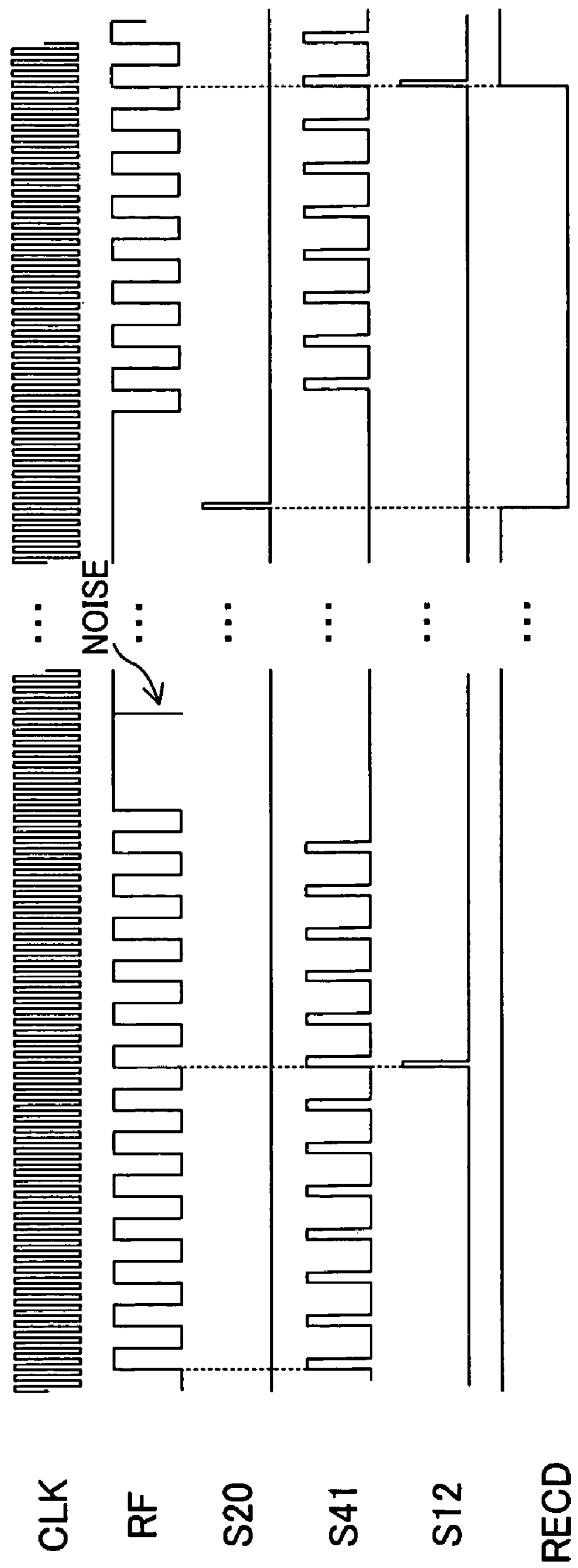
FIG. 8 is a timing chart showing signals in the individual portions of the circuit for detecting a recorded area.

A description will be given herein below to the operation of the circuit for detecting a recorded area of an optical disk thus constituted according to the present embodiment with reference to the timing charts of FIGS. 7 and 8.

First, the digitized signal RF of the RF signal is inputted to the counter 40 for detecting a mark portion. The counter 40 for detecting a mark portion repeatedly measures the length of each mark portion recorded in the digitized signal RF based on the reference clock CLK and outputs the output pulse S41 only when the inputted mark length falls between the minimum and maximum mark lengths by judging that the mark portion has been read normally. Each of the output pulses S41 is inputted to the counter 81 for detecting a recorded area. The counter 81 for detecting a recorded area counts the output pulses S41 from the counter 40 for detecting a mark portion and outputs the reset signal S12 to the counter 80 for detecting an unrecorded area every time it counts a specified number to trigger a reset, while simultaneously bringing the recorded area signal RECD from the flip-flop circuit 82 to the "H" level.

In the unrecorded area of the optical disk, the counter 40 for detecting a mark portion does not output the output pulse S41 so that the counter 81 for detecting a recorded area is brought into a halted state. Accordingly, the counter 80 for detecting an unrecorded area is not reset by the counter 81 for detecting a recorded area and continues to count based on the reference clock CLK. When the counter 80 for detecting an unrecorded area has counted for a specified time, it outputs the unrecorded area detection signal S20 to bring the recorded area signal RECD from the flip-flop circuit 82 to the "L" level and reset the counter 81 for detecting a recorded area.

Even when unnecessary noise is superimposed on the unrecorded area of the optical disk, the time during which the noise stays superimposed has a high possibility of being not more than the minimum mark length so that the counter 40 for detecting a mark portion makes a noise judgment and does not output the output pulse S41 to the counter 81 for detecting a recorded area. This prevents the counter 81 for detecting a recorded area from erroneously counting the noise as a mark portion and erroneously resetting the counter 80 for detecting an unrecorded area. As a result, it becomes possible to detect a recorded area with accuracy higher than achieved conventionally.

Embodiment 5

Figure 9:
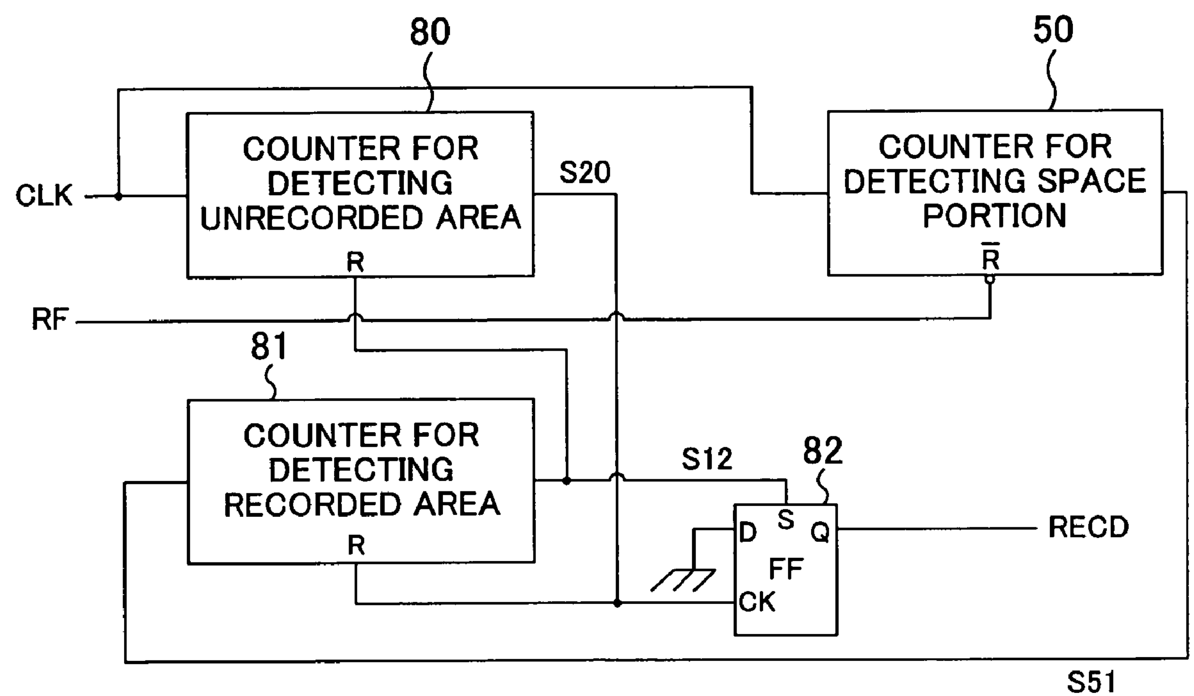
FIG. 9 is a view showing a circuit for detecting a recorded area of an optical disk according to a fifth embodiment of the present invention.

FIG. 9 shows the structure of a circuit for detecting a recorded area of an optical disk in a fifth embodiment of the present invention.

The circuit for detecting a recorded area shown in the drawing comprises a counter 50 for detecting a space portion having an internal structure different from that of the counter 20 for detecting a space portion shown in FIG. 3. When the reference clock CLK is inputted to the input terminal of the counter 50 for detecting a space portion and the inversion signal of the digitized signal RF of the RF signal is inputted to the reset terminal thereof, the counter 50 for detecting a space portion measures the length of a space portion recorded in the digitized signal RF through time measurement based on the reference clock CLK, compares the measured space length with a minimum space length and the maximum space length, and outputs an output signal (pulse) S51 only when the measured space length falls between the minimum and maximum space lengths by judging that the space portion has been read normally. The output signal S51 is inputted for the detection of a recorded area to the counter 81 for detecting a recorded area. The unrecorded area detection signal S20 from the counter 80 for detecting an unrecorded area is inputted as a reset signal to the reset terminal R of the counter 81 for detecting a recorded area. The time interval between successive outputting of the reset signal S20 from the counter 80 has been set to be sufficiently longer than the time interval between successive outputting of the reset signal S12 from the counter 81 in the recorded area of the optical disk. As for the other components, they are the same as in FIG. 7 so that the description thereof will be omitted by using like reference numerals to designate like parts.

Figure 10:
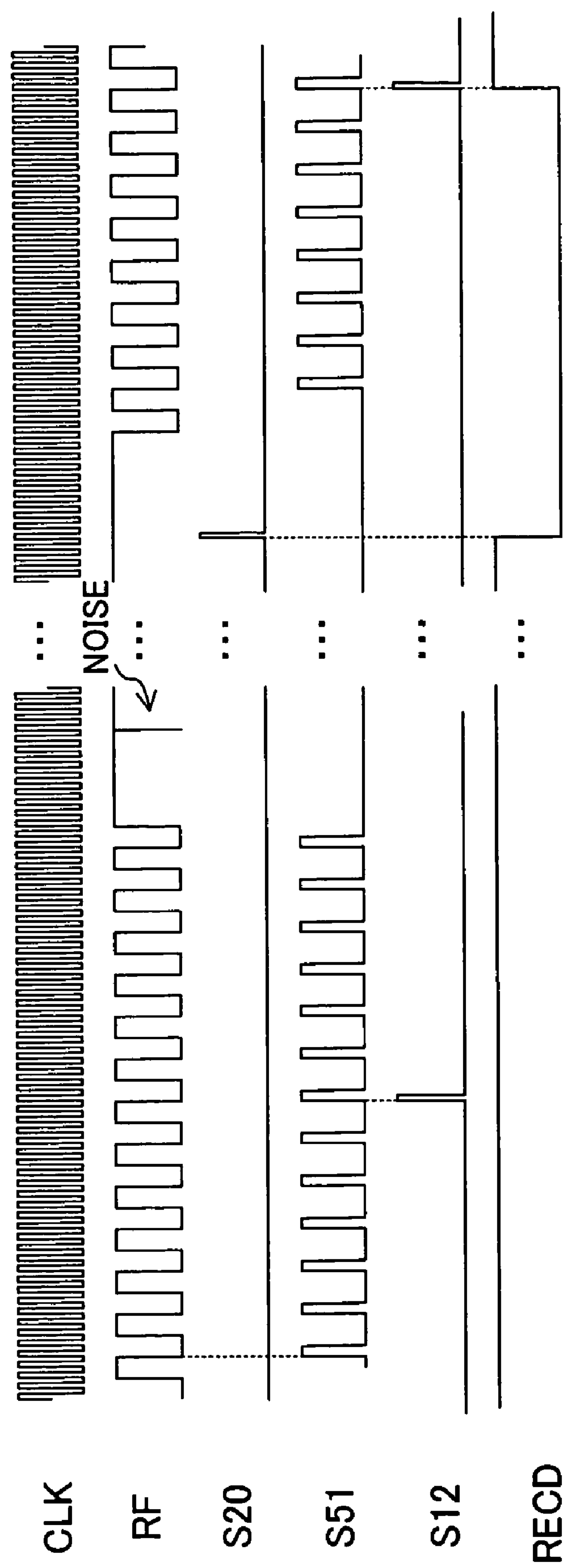
FIG. 10 is a timing chart showing signals in the individual portions of the circuit for detecting a recorded area.

A description will be given herein below to the operation of the circuit for detecting a recorded area of an optical disk thus constituted according to the present embodiment with reference to the timing charts of FIGS. 9 and 10.

First, the digitized signal RF of the RF signal is inputted to the counter 50 for detecting a space portion. The counter 50 for detecting a space portion repeatedly measures the length of each space portion recorded in the digitized signal of the RF signal based on the reference clock CLK and outputs the output pulse S51 only when each inputted space length falls between the minimum and maximum space lengths by judging that the space portion has been read normally. The counter 81 for detecting a recorded area counts the output pulses S51 from the counter 50 for detecting a space portion and outputs the reset signal S12 to the counter 80 for detecting an unrecorded area every time it counts a specified number to trigger a reset, while simultaneously bringing the recorded area signal RECD from the flip-flop circuit 82 to the "H" level.

In the unrecorded area of the optical disk, the counter 50 for detecting a space portion does not output the output pulse S51 so that the counter 81 for detecting a recorded area is brought into a halted state. Accordingly, the counter 80 for detecting an unrecorded area is not reset by the counter 81 for detecting a recorded area and continues to count based on the reference clock CLK. When the counter 80 for detecting an unrecorded area has counted for a specified time, it outputs an unrecorded area detection signal S20 to bring the recorded area signal RECD from the flip-flop circuit 82 to the "L" level and reset the counter 81 for detecting a recorded area.

Even when unnecessary noise is superimposed on the unrecorded area of the optical disk, the inter-noise time has a high possibility of being not more than the minimum space length so that the counter 50 for detecting a space portion makes a noise judgment and does not output the output pulse S51. This prevents the counter 81 for detecting a recorded area from erroneously counting the noise as a mark portion and erroneously resetting the counter 80 for detecting an unrecorded area. As a result, it becomes possible to detect the recorded area with accuracy higher than achieved conventionally.

Embodiment 6

Figure 11:
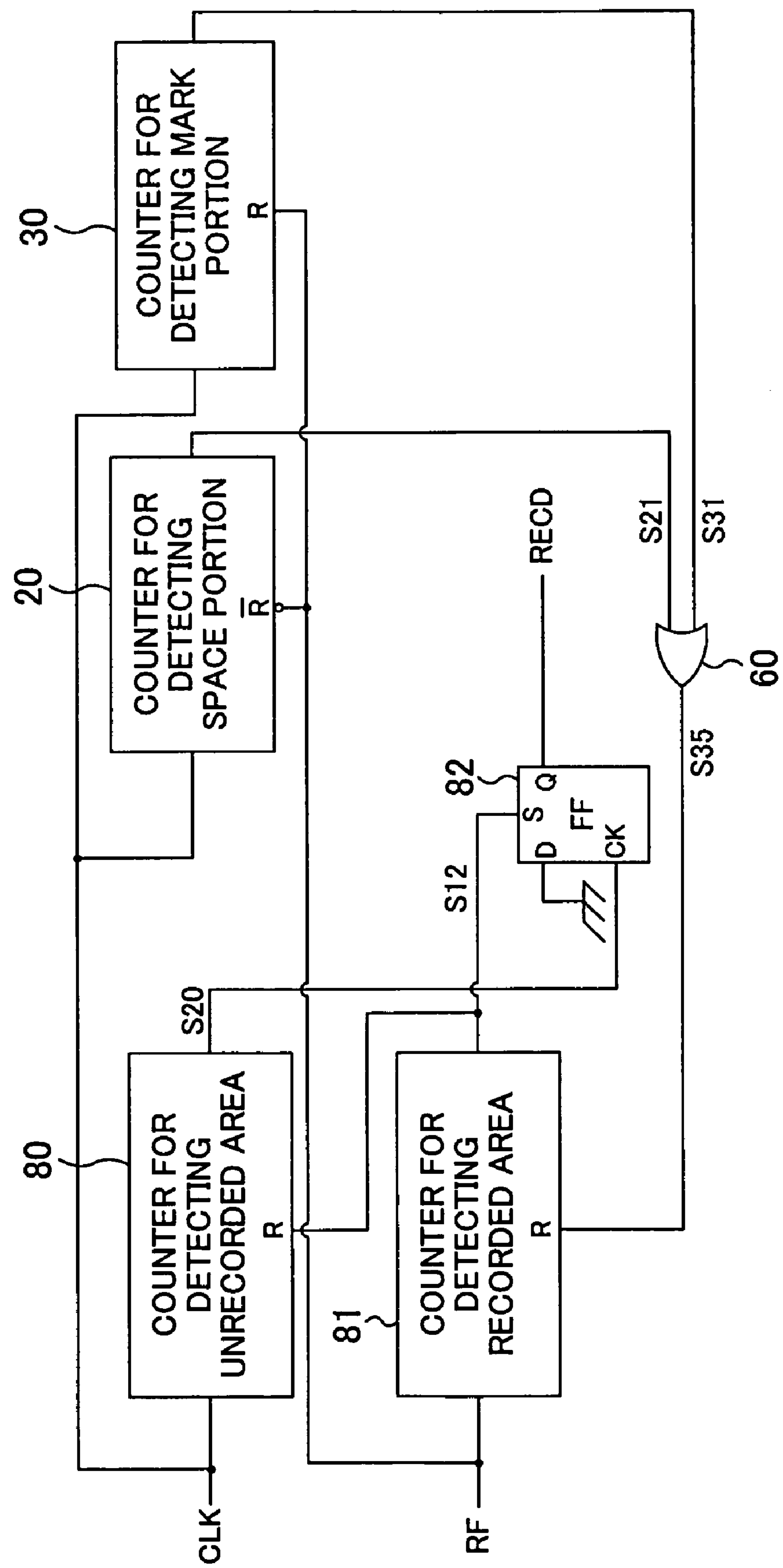
FIG. 11 is a view showing a circuit for detecting a recorded area of an optical disk according to a sixth embodiment of the present invention.

FIG. 11 shows the structure of a circuit for detecting a recorded area of an optical disk in a sixth embodiment of the present invention.

The circuit for detecting a recorded area shown in the drawing comprises each of the counter 20 for detecting a space portion of FIG. 3 showing the second embodiment and the counter 30 for detecting a mark portion of FIG. 5 showing the third embodiment. The respective reset signals S21 and S31 from the counters 20 and 30 are inputted to the reset terminal of the counter 81 for detecting a recorded area through an OR circuit 60. The time interval between successive outputting of the unrecorded area detection signal S20 from the counter 80 has been set to be sufficiently longer than the time interval between successive outputting of the reset signal S12 from the counter 81 in the recorded area of the optical disk. As for the other components, they are the same as in FIGS. 3 and 5 so that the description thereof will be omitted by using like reference numerals to designate like parts.

Figure 12:
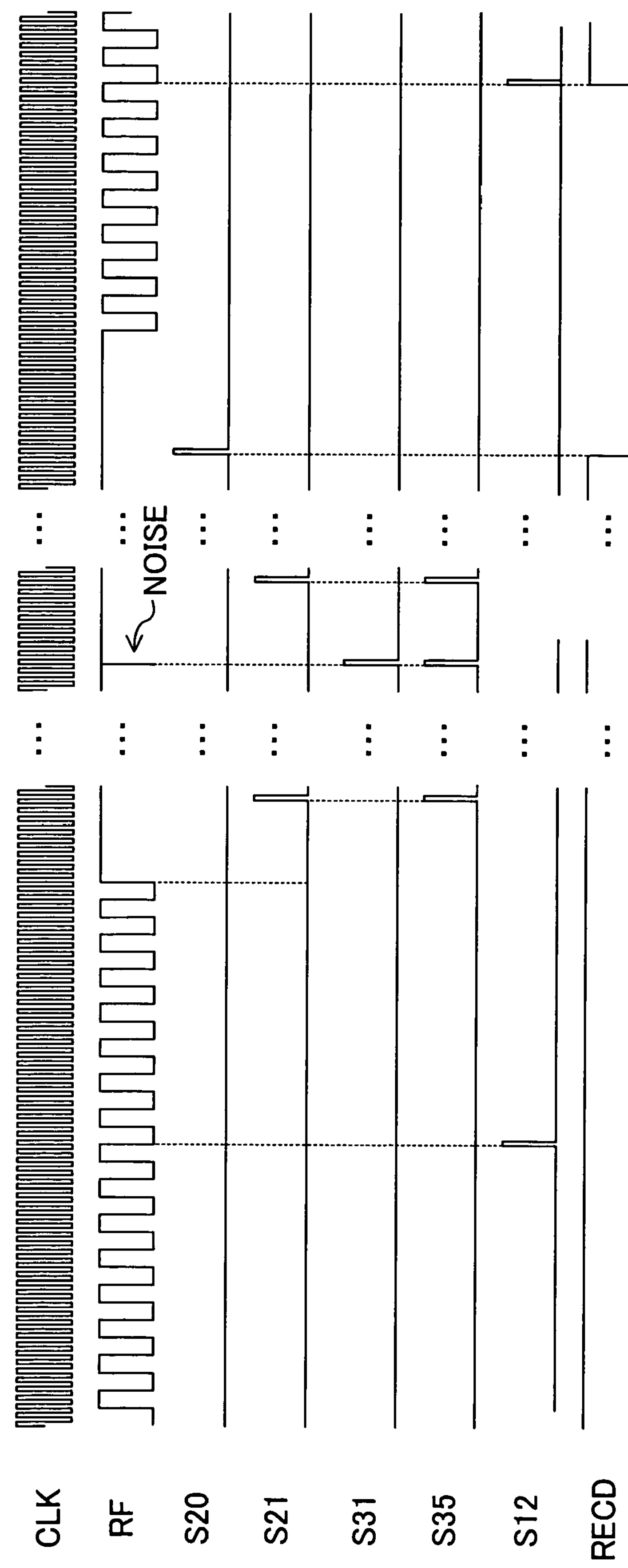
FIG. 12 is a timing chart showing signals in the individual portions of the circuit for detecting a recorded area.

A description will be given herein below to the operation of the circuit for detecting a recorded area of an optical disk thus constituted according to the present embodiment with reference to the timing charts of FIGS. 11 and 12.

First, the digitized signal RF of the RF signal is inputted to the counter 81 for detecting a recorded area. The counter 81 for detecting a recorded area outputs the reset signal S12 to the counter 80 for detecting an unrecorded area to trigger a reset every time it counts a specified number of mark portions in the recorded area of the optical disk, while simultaneously bringing the recorded area signal RECD from the flip-flop circuit 82 to the “H” level. In the mean time, the counter 20 for detecting a space portion performs the operation of being reset with the mark portion of the digitized signal RF and starting counting when the digitized signal has shifted to the space portion. On the other hand, the counter 30 for detecting a mark portion performs the operation of being reset with the space portion of the digitized signal RF and starting counting when the digitized signal has shifted to the mark portion.

In the unrecorded area of the optical disk, the counter 20 for detecting a space portion counts up to a value not less than the set value, detects a space portion with a length not less than a maximum space length to recognize that the detected space portion is a signal-unrecorded area, and outputs the reset signal S21 to the OR circuit 60 to halt the counting operation.

When unnecessary noise is superimposed on the unrecorded area of the optical disk, the counter 30 for detecting a mark portion is reset at a count not more than a set value, detects a mark portion with a length not more than the minimum mark length to recognize that unnecessary noise has been superimposed on the signal-unrecorded area, and outputs the reset signal S31 to the OR circuit 60. After the noise, the possibility that a space portion with a length not less than the maximum space length is high so that, upon counting up to a value not less than the set value, the counter 20 for detecting a space portion outputs the reset signal S21 to the OR circuit 60. The OR circuit 60 performs a logic OR operation between the two reset signals S21 and S31 and outputs the result thereof as a reset signal S35 to the counter 81 for detecting a recorded area.

In the unrecorded area, the mark portion of the digitized signal RF is not inputted to the counter 81 for detecting a recorded area so that the counter 81 is brought into a halted state. Accordingly, the counter 80 for detecting an unrecorded area is not reset by the counter 81 for detecting a recorded area and continues to count based on the reference clock CLK. When the counter 80 for detecting an unrecorded area has counted for a specified time, it outputs the unrecorded area detection signal S20 to bring the recorded area signal RECD from the flip-flop circuit 82 to the “L” level.

Thus, according to the present embodiment, even when unnecessary noise is superimposed on the unrecorded area, the counter 81 for detecting a recorded area can be reset by using the counter 20 for detecting a space portion and the counter 30 for detecting a mark portion. This prevents erroneous resetting of the counter 80 for detecting an unrecorded area and allows higher-accuracy detection of a recorded area than has been performed conventionally.

Embodiment 7

Figure 13:
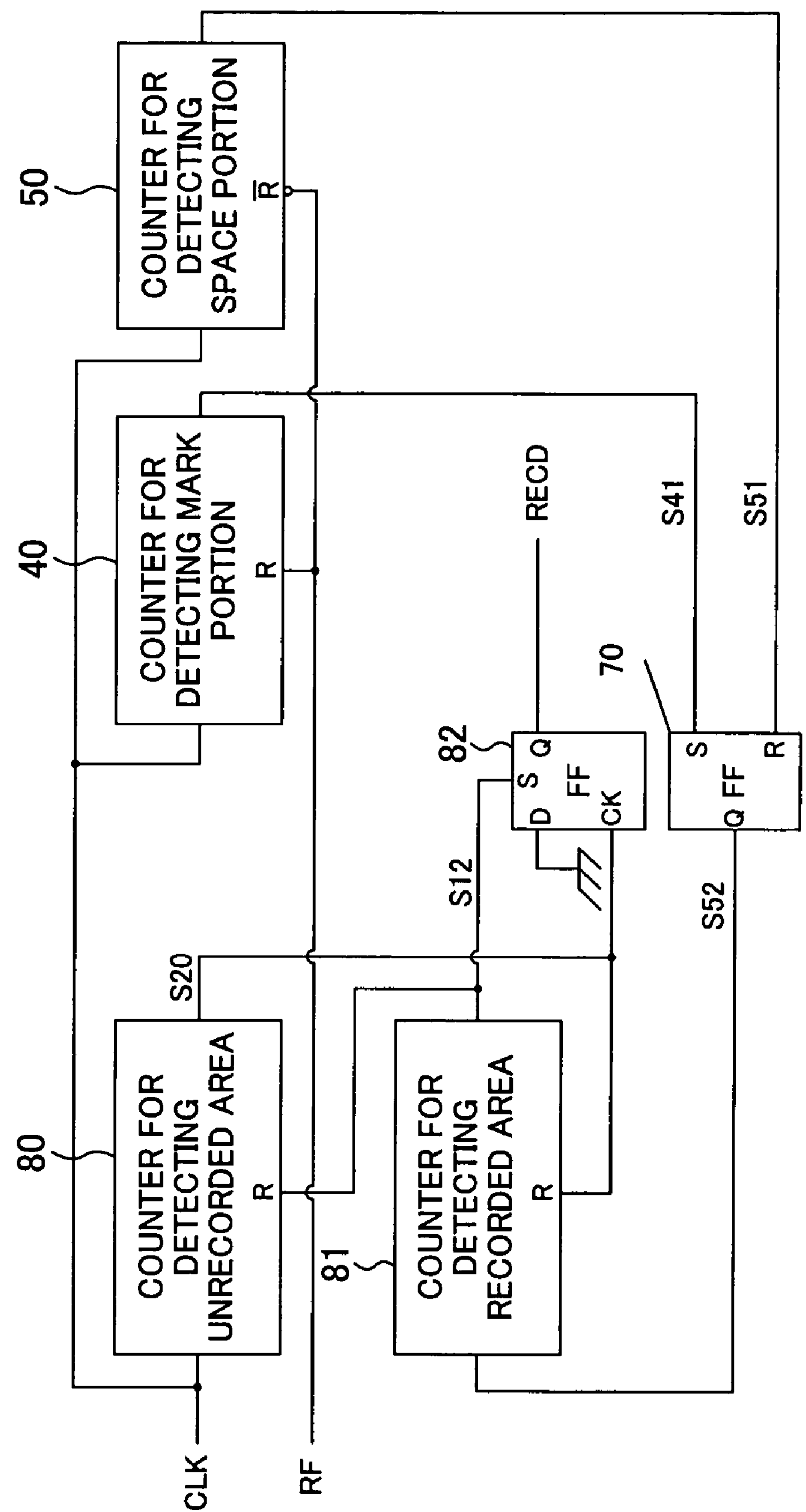
FIG. 13 is a view showing a circuit for detecting a recorded area of an optical disk according to a seventh embodiment of the present invention.

FIG. 13 shows the structure of a circuit for detecting a recorded area of an optical disk in a seventh embodiment of the present invention.

The circuit for detecting a recorded area shown in the drawing comprises each of the counter 40 for detecting a mark portion of FIG. 7 showing the fourth embodiment and the counter 50 for detecting a space portion of FIG. 9 showing the fifth embodiment. A reset signal S41 from the counter 40 for detecting a mark portion is inputted to the set terminal S of a flip-flop circuit 70. On the other hand, a reset signal S51 from the counter 50 for detecting a space portion is inputted to the reset terminal R of the flip-flop circuit 70 and the output thereof is inputted for the detection of a recorded area from the output terminal Q to the counter 81 for detecting a recorded area. The time interval between successive outputting of the reset signal S20 from the counter 80 has been set to be sufficiently longer than the time interval between successive outputting of the reset signal S12 from the counter 81 in the recorded area of the optical disk. As for the other components, they are the same as in FIGS. 7 and 9 so that the description thereof will be omitted by using like reference numerals to designate like parts.

Figure 14:
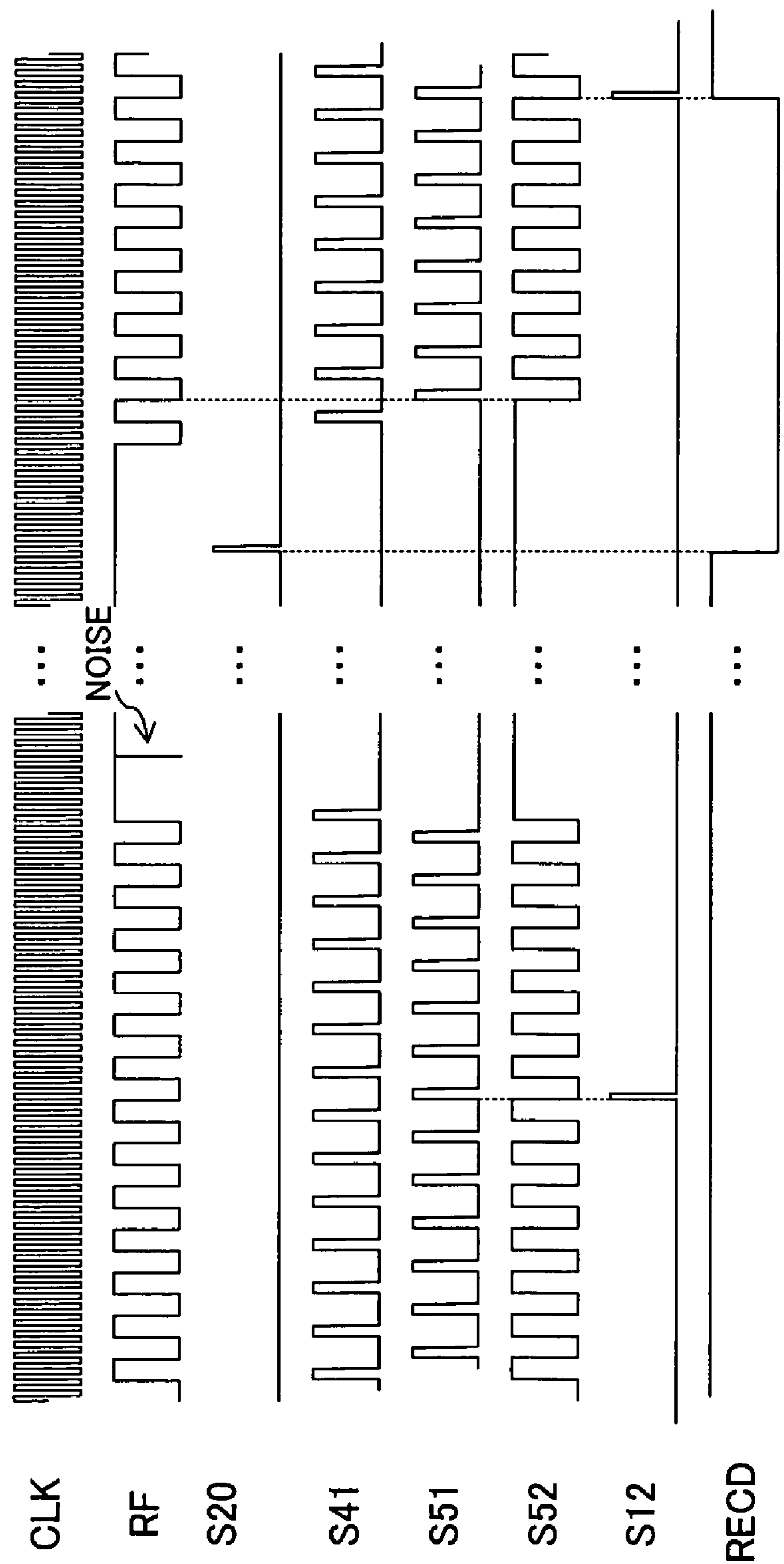
FIG. 14 is a timing chart showing signals in the individual portions of the circuit for detecting a recorded area.
Figure 15:
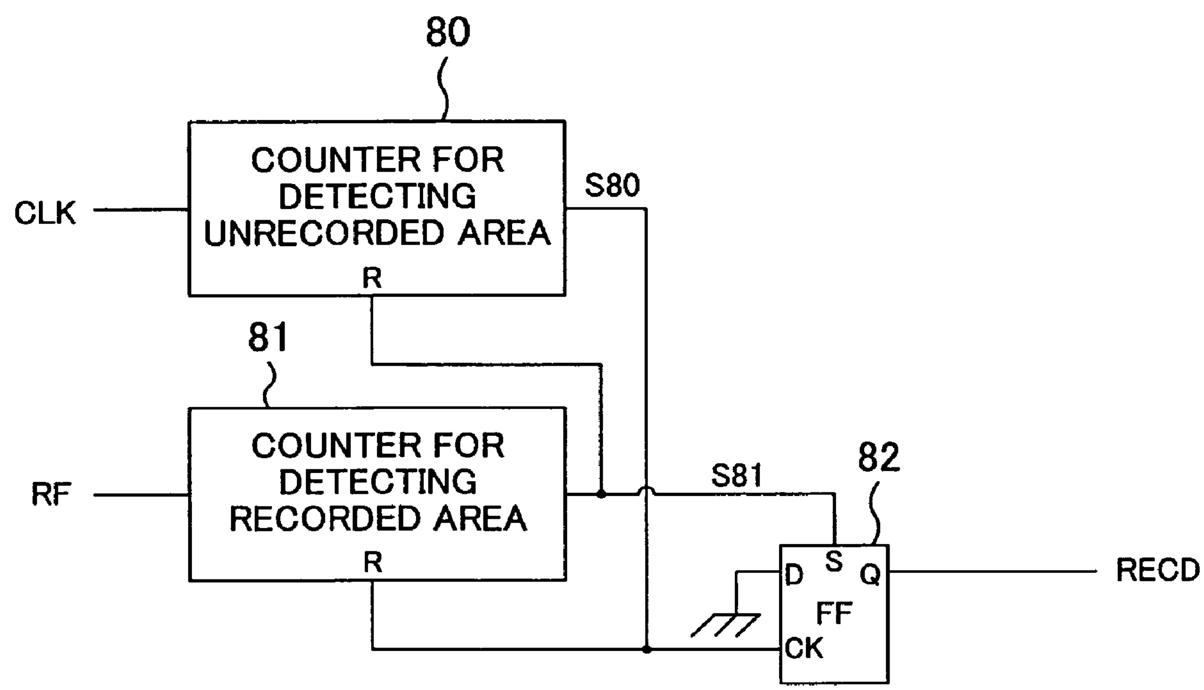
FIG. 15 is a view showing a conventional circuit for detecting a recorded area of an optical disk.
Figure 16:
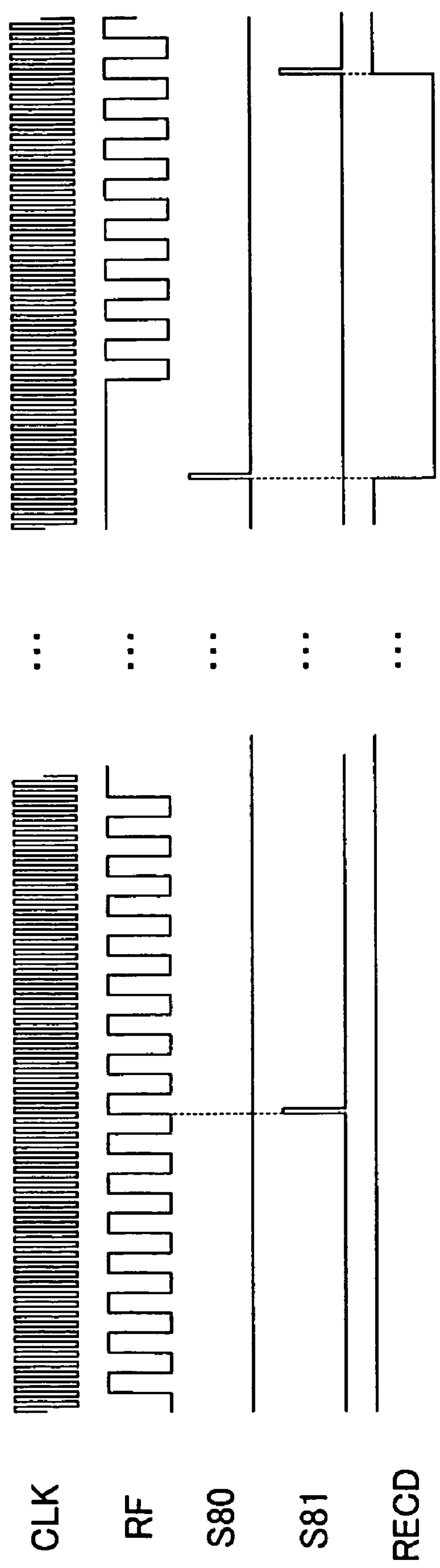
FIG. 16 is a timing chart showing signals in the individual portions of the conventional circuit for detecting a recorded area in a normal state.
Figure 17:
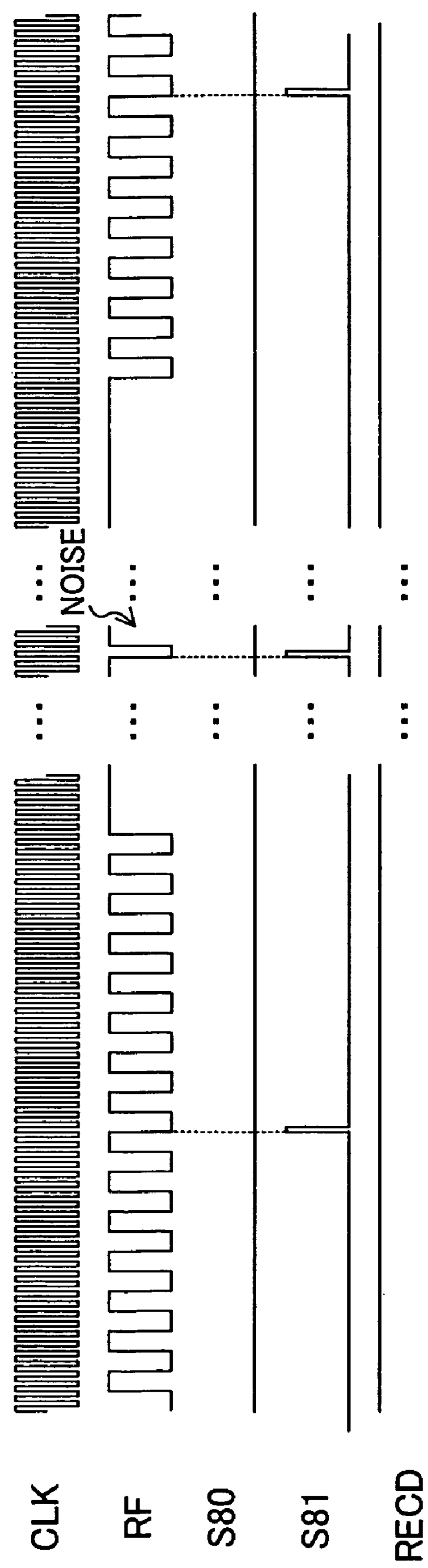

A description will be given herein below to the operation of the circuit for detecting a recorded area of an optical disk thus constituted according to the present embodiment with reference to the timing charts of FIGS. 13 and 14.

First, the digitized signal RF of the RF signal is inputted to the counter 40 for detecting a mark portion. The counter 40 for detecting a mark portion repeatedly measures the length of a mark portion recorded in the digitized signal RF based on the reference clock CLK and outputs the output pulse S41 only when the inputted mark length falls between the minimum and maximum mark lengths by judging that the mark portion has been read normally. On the other hand, the digitized signal RF of the RF signal is inputted to the counter 50 for detecting a space portion. The counter 50 for detecting a space portion measures the length of the recorded space portion based on the reference clock CLK and outputs the output pulse S51 only when each inputted space length falls between the minimum and maximum space lengths by judging that the space portion has been read normally.

The flip-flop circuit 70 generates a signal S52 obtained by removing a noise component from the original digitized signal RF with the signals of these output pulses S41 and S51 and inputs the generated signal S52 to the counter 81 for detecting a recorded area. The counter 81 for detecting a recorded area counts the signals S52 from each of which the noise component has been removed and outputs the reset signal S12 to the counter 80 for detecting an unrecorded area to trigger a reset every time it counts a specified number, while simultaneously bringing the recorded area signal RECD from the flip-flop circuit 82 to the “H” level.

In the unrecorded area of the optical disk, the counter 40 for detecting a mark portion does not output the output pulse S41 and the counter 50 for detecting a space portion does not output the output pulse S51 so that the counter 81 for detecting a recorded area is brought into a halted state. Accordingly, the counter 80 for detecting an unrecorded area is not reset by the counter 81 for detecting a recorded area and continues to count based on the reference clock CLK. When the counter 80 for detecting an unrecorded area has counted for a specified time, it outputs the unrecorded area detection signal S20 to bring the recorded area signal RECD from the flip-flop circuit 82 to the “L” level and reset the counter 81 for detecting a recorded area.

When unnecessary noise is superimposed on the unrecorded area of the optical disk, the width of the noise has a high possibility of being smaller than the minimum mark length and the time after the noise has a high possibility of being not less than the maximum space length so that each of the counter 40 for detecting a mark portion, the counter 50 for detecting a space portion, and the flip-flop circuit 70 makes a noise judgment and does not output the output signal S52 to the counter 81 for detecting a recorded area. Because the counter 81 for detecting a recorded area counts the signals S52 with no noise component, it is prevented from erroneously resetting the counter 80 for detecting an unrecorded area due to noise. As a result, it becomes possible to detect a recorded area with accuracy higher than achieved conventionally.

INDUSTRICAL APPLICABILITY

Since the present invention can thus reduce the probability of erroneous recognition by which an unrecorded area of an optical disk is erroneously detected as a recorded area even though unnecessary noise is superimposed on the digitized signal of the RF signal from the optical disk, it is useful for a circuit for detecting a recorded area capable of detecting a recorded area of a write-once/rewritable optical disk with high accuracy.

What is claimed is:

1. A circuit for detecting a recorded area of an optical disk, the circuit comprising:

a counter for detecting an unrecorded area; and a counter for detecting a recorded area, wherein the counter for detecting an unrecorded area receives a reference clock, outputs an unrecorded area detection signal as a first output, and outputs a reset signal to the counter for detecting a recorded area as a second output, respective times elapsed until the unrecorded area detection signal as the first output is outputted, and until the reset signal is outputted to the counter for detecting a recorded area as the second output satisfy a relationship represented by:

Time Elapsed Until Unrecorded Area Detection Signal as First Output is Outputted>Time Elapsed Until Reset Signal is Outputted to Counter for Detecting Recorded Area as Second Output, and the counter for detecting a recorded area receives a digitized signal obtained by digitizing an RF signal from the optical disk and produces an output serving as a reset signal for resetting the counter for detecting an unrecorded area and also as a recorded area detection signal.

2. The circuit of claim 1, wherein respective times elapsed until the unrecorded area detection signal is outputted from the counter for detecting an unrecorded area, until the reset signal is outputted to the counter for detecting a recorded area, and until the recorded area detection signal is outputted from the counter for detecting a recorded area satisfy a relationship represented by:

Time Elapsed Until Unrecorded Area Detection Signal is Outputted>Time Elapsed Until Reset Signal is Outputted to Counter for Detecting Recorded Area>Time Elapsed Until Recorded Area Detection Signal is Outputted, wherein the time elapsed until the unrecorded area detection signal is outputted is longest.

* * * * *